United States Patent
Abramenko et al.

(10) Patent No.: US 10,753,798 B2
(45) Date of Patent: Aug. 25, 2020

(54) COMPACT WIDEBAND VUV SPECTROMETER

(71) Applicant: RnD-ISAN, LTD, Troitsk, Moscow (RU)

(72) Inventors: Dmitriy Borisovich Abramenko, Moscow (RU); Vladimir Mikhailovich Krivtsun, Moscow (RU); Aleksander Petrovich Shevelko, Moscow (RU); Oleg Feliksovich Yakushev, Moscow region (RU)

(73) Assignee: RnD-ISAN, Ltd, Troitsk, Moscow (RU)

( * ) Notice: Subject to any disclaimer, the term of this patent is extended or adjusted under 35 U.S.C. 154(b) by 0 days.

(21) Appl. No.: 16/618,480

(22) PCT Filed: Jul. 10, 2018

(86) PCT No.: PCT/RU2018/000455
§ 371 (c)(1),
(2) Date: Dec. 2, 2019

(87) PCT Pub. No.: WO2019/017819
PCT Pub. Date: Jan. 24, 2019

(65) Prior Publication Data
US 2020/0173853 A1    Jun. 4, 2020

(30) Foreign Application Priority Data

Jul. 18, 2017   (RU) .................. 2017125698

(51) Int. Cl.
*G01J 3/28*   (2006.01)
*G01J 3/02*   (2006.01)
(Continued)

(52) U.S. Cl.
CPC .......... *G01J 3/2803* (2013.01); *G01J 3/0256* (2013.01); *G01J 3/1804* (2013.01); *G01J 3/1833* (2013.01);
(Continued)

(58) Field of Classification Search
CPC ....... G01J 3/2803; G01J 3/0256; G01J 3/1804; G01J 3/1833; G01J 3/36; G01J 2003/2813; G02B 5/1838
See application file for complete search history.

(56) References Cited

U.S. PATENT DOCUMENTS 3,237,508 A * 3/1966 Keller .................. G02B 5/1861
                                                    359/572
4,241,999 A * 12/1980 Pouey .................. G01J 3/1838
                                                    356/331

(Continued)

FOREIGN PATENT DOCUMENTS

RU        2593423 C1    8/2016

OTHER PUBLICATIONS

Google Patents—RU 2593423 C1—English Translation obtained May 13, 2020 (Year: 2020).*

*Primary Examiner* — David P Porta
*Assistant Examiner* — Jeremy S Valentiner
(74) *Attorney, Agent, or Firm* — Nadya Reingand; Yan Hankin (57) ABSTRACT

The invention relates to a compact wideband vacuum ultraviolet (VUV) and soft X-ray grazing incidence spectrometer based on a plane amplitude diffraction grating. The spectrometer enables simultaneous detection of a VUV spectrum in a positive first order of diffraction and a negative first order of diffraction. The technical result of the invention is that of recording a spectrum in a wide spectral range (3-200 nm) with a moderate spectral resolution ($\lambda/\delta\lambda\sim15$-$30$) and (Continued)

with a significantly higher spectral resolution ($\lambda/\delta\lambda \sim 100\text{-}200$) in a narrow soft X-ray or extreme ultraviolet range with the possibility of measuring the absolute radiation output in these regions of the spectrum.

19 Claims, 6 Drawing Sheets

(51) Int. Cl.
  *G01J 3/18* (2006.01)
  *G01J 3/36* (2006.01)
  *G02B 5/18* (2006.01)
(52) U.S. Cl.
  CPC .............. *G01J 3/36* (2013.01); *G02B 5/1838* (2013.01); *G01J 2003/2813* (2013.01)

(56) References Cited

U.S. PATENT DOCUMENTS

| | | | |
|---|---|---|---|
| 4,268,115 A * | 5/1981 | Slemon | G02B 6/3825 385/88 |
| 7,485,869 B2 | 2/2009 | Harrison et al. | |
| 2006/0119945 A1* | 6/2006 | Balakrishnan | G02B 5/32 359/572 |
| 2006/0146344 A1 | 7/2006 | Biel | |
| 2008/0203314 A1* | 8/2008 | Harrison | G01J 3/027 250/372 |
| 2020/0064552 A1* | 2/2020 | Fattal | H04N 13/302 |

* cited by examiner

# COMPACT WIDEBAND VUV SPECTROMETER

CROSS-REFERENCE TO RELATED APPLICATIONS

The present patent application is a National stage application from PCT application PCT/RU2018/000455 filed Jul. 10, 2018 claiming priority to Russian patent application RU2017125698 filed Jul. 18, 2017.

FIELD OF INVENTION

The invention relates to analytical instrument engineering, namely, to compact spectrometers designed for measuring the vacuum ultraviolet (VUV) radiation spectrum.

BACKGROUND OF INVENTION

VUV range spectroscopy is one of the most efficient methods for plasma diagnostics applied in studies of hot fusion plasma, active medium of X-ray lasers, and astrophysical plasma. Extreme ultraviolet (EUV) range spectroscopy is relevant in terms of developing lithographic EUV radiation sources based on high-temperature plasma for mass production of new generation ICs.

For VUV range, spectrometers which employ phase reflection diffraction gratings with beam grazing incidence, find use. Generally, concave grooved glass diffraction gratings with gold or tungsten coatings, are applied. Spherical gratings are simpler as compared to toroidal gratings which help increase luminosity and improve spatial resolution. The grazing angle is 1-10°.

A soft X-ray and VUV range spectrometer is known, which comprises the entrance slit, the concave phase grazing incidence diffraction grating and the detector, located on the Rowland circle, Schwob J. L., et al. Review of Scientific Instruments, 58, 1601 (1987). The spectrometer is designed with an arrangement similar to that of Rowland. The difference consists in the registration surface being flat and not concave along the Rowland's circle, as it is required to ensure a wide spectral recording region. The spectrometer is characterized by a sufficiently high spectral resolution. However, due to limited recorded spectral region, several spectrometers were required in the above-mentioned paper, making the measurement procedure much more complicated. Besides, for certain detectors, such as those using microchannel plates (MCP), their illumination with grazing incidence results in significant reduction of detector quantum efficiency, and at the same time, dramatically increases the level of noise.

These drawbacks are partially overcome in the spectrometer with an entrance slit, an amplitude slit grating, an optical detector based on digital backlit CCD camera designed for recording in the 1st or −1st orders of VUV radiation spectra, Wilhein, T., et al. Review of Scientific Instruments, 70(3), 1694 (1999). A key feature of the spectrometer consists in using an amplitude grating with the 1:1 ratio of transmissive and non-transmissive parts which ensures suppression of all even spectrum orders, as well as significantly reduces radiation intensities in the odd higher diffraction orders. The spectrometer is characterized by a wide spectral range, high luminosity and spectral resolution, as well as small size. Amplitude grating efficiency can be calculated theoretically, which allows taking absolute measurements in a fairly wide spectral range, if an absolutely calibrated optical detector is used.

However, the transmissive grating is expensive, fragile and subject to contaminant deposition. With time, this can result in deterioration of grating structure and quality of recorded spectral image, reducing the instrument's reliability. Besides, serious challenges exist in the long wavelength range ($\lambda \geq 100$ nm) in terms of calculating the slit grating transmission. It becomes indefinite, which limits the spectral range for absolute measurements.

These shortcomings are not present in the compact soft X-ray and VUV range spectrometer designed with the configuration based on "outside Rowland" spectrum recording, Shevelko A. P. et al. Plasma Physics Reports. 34 (11), 944 (2008). The spectrometer comprises an entrance slit located on the Rowland's circle, a concave grazing incidence diffraction grating, and an image detector, whose input surface crosses the Rowland's circle at an angle which is close to normal angle. Notably, spectrum is recorded in the plane that is perpendicular to diffracted beams which provides for comfortable and easy application of spectrometer with various detector types. Spectrometer benefits include its small size, ease of operation and excellent reliability.

However, in the above-mentioned geometry of "outside Rowland's" spectrometer, ideal focusing of diffracted radiation occurs only in one point—point of registration plane intersection with the Rowland's circle, while moving away from this point results in decrease of spectral resolving power due to defocusing. As a result, the recorded spectral range is quite narrow, and the spectral resolution is fairly low.

This shortcoming is partially overcome in the compact VUV spectrometer with concave grazing incidence diffraction grating where the entrance slit is located inside the Rowland's circle, and the optical detector surface intersects twice the focusing surface of spectral lines which corresponds to position of the entrance slit removed from the Rowland's circle, Antsiferov P. S., et al. Review of Scientific Instruments 87, 053106 (2016). The spectrometer ensures a wider range of recorded VUV spectrum, with the long-wavelength limit reaching around 50 nm.

However, for certain applications measurements in a wider VUV spectrum range are required. For example, when radiation of lithographic EUV sources is recorded, it is preferable to take measurements both near the source working wavelength, $\lambda=13.5$ nm, and in the widest possible VUV range with the capability of measuring absolute radiation yield in various spectrum ranges.

SUMMARY

The invention is based on the objective to improve the compact spectrometer by expanding the VUV spectrum recording range and ensuring the capability of absolute intensity measurements in the spectrum.

The technical result of the invention is recording the spectrum simultaneously in a very wide spectral range (3-200 nm) with moderate spectral resolution ($\lambda/\delta\lambda \sim 15\text{-}30$) and with much higher spectral resolution ($\lambda/\delta\lambda \sim 200$) in a narrow soft X-ray or EUV range, for example, around $\lambda=13.5$ nm. At the same time, a capability of measuring absolute radiation yield in these spectral regions is ensured, and an even smaller spectrometer size is achieved.

The formulated objective is accomplished using the proposed spectrometer comprising an entrance slit located in a housing illuminated by a remote radiation source and emitting a radiation beam which illuminates a diffraction grating having a constant period d under a grazing angle $\theta$, and a detector.

The spectrometer is different in that the diffraction grating is designed to be flat, with a relief, with flat reflective working faces which lie in a grating plane, and with non-reflective grooves between the working faces, whereas the detector is capable of recording VUV spectra in a −1st diffraction order.

Preferably, a working spectral region lies in a range of 5 to 200 nm.

Preferably, a width of the diffraction grating working faces equals d/2, a diffraction grating half-period.

Preferably, a depth of the grooves between the grating working faces is greater than d/4 sin θ.

Preferably, the diffraction grating is designed with either rectangular or trapezoidal profile of the grooves between the working faces.

Preferably, the diffraction grating is located as close to the entrance slit as possible.

Preferably, a radiation source angular size, defined by a ratio of its characteristic dimension a and its distance from the entrance slit A, is not greater than $10^{-3}$ rad: $a/A \leq 10^{-3}$ rad.

Preferably, the grazing angle θ is in a range of 4 to 6 degrees.

Preferably, the detector is a multi-element one.

Preferably, the spectrometer features spectral sensitivity calibration.

Embodiments of the invention feature a two-dimensional detector, and the entrance slit is illuminated through an additional slit installed between the entrance slit and the radiation source and parallel to a dispersion plane.

Preferably, a detector edge defines a long-wavelength limit $\lambda_{-1}$ of the −1st diffraction order working spectral region Preferably, the housing is designed as quick-release part of a pressure-tight joint.

Preferably, the spectrometer provides an additional VUV spectrum recording in the +1st diffraction order, whereas the long-wavelength limit of the +1st order working spectral region $\lambda_{+1}$ is many times less than the long-wavelength limit of the −1st order working spectral region $\lambda_{-1}$: $\lambda_{+1} \ll \lambda_{-1}$.

Preferably, the detector is installed relative to the diffraction grating in such a manner that the diffraction angle in the direction of detector edge is not greater than 90°.

Preferably, the detector edge defines the long-wavelength limit $\lambda_{+1}$ of the +1st diffraction order working spectral region.

In embodiments of the invention, the grazing angle θ is selected in such a manner that a cut-off wavelength $\lambda_{co}$ corresponding to a diffraction angle ψ=90° is greater than a EUV lithography wavelength of 13.5 nm: $\lambda_{co}>13.5$ nm, and the +1st order working spectral region includes the wavelength of 13.5 nm: $\lambda_{+1} \geq 13.5$ nm.

In embodiments of the invention, the +1st order working spectral region includes a wavelength of 13.5 nm and the long-wavelength limit $\lambda_{-1}$ of the working spectral region is close to the wavelength of 13.5 nm: $0<(\lambda_{+1}-13.5 \text{ nm})\ll 13.5$ nm.

In embodiments of the invention, a gate is installed before the detector which inhibits radiation in a 0 diffraction order.

Preferably, the spectrometer is provided with software designed for acquisition, processing, display and storage of spectral measurement data in the +1st and −1st diffraction orders.

In terms of another aspect, the invention relates to a compact wide-range VUV grazing incidence spectrometer with an entrance slit located in a housing illuminated by a remote radiation source and emitting a radiation beam which illuminates a diffraction grating having a constant period d under a grazing angle θ, and a radiation detector. The spectrometer is different in that the diffraction grating is designed to be flat, with a relief, with flat reflective working faces which lie in a grating plane, and with non-reflective grooves between the working faces; the radiation detector allows for VUV spectrum recording in a +1st diffraction order and a −1st diffraction order, whereby a long-wavelength limit $\lambda_{+1}$ of a +1st order working spectral region is many times less than a long-wavelength limit $\lambda_{-1}$ of a −1st order working spectral region: $\lambda_{+1} \ll \lambda_{-1}$, and a spectral resolution $(\lambda/\delta\lambda)_{+1}$ in the −1st order working spectral region is many times greater than the spectral resolution $(\lambda/\delta\lambda)_{-1}$ in the −1st order working spectral region: $(\lambda/\delta\lambda)_{+1} \gg (\lambda/\delta\lambda)_{-1}$.

The following cause and effect relationships exist between the aggregate of essential features of the claimed subject and the technical result achieved.

If implemented in the proposed form, the spectrometer allows to record spectra of the −1st diffraction order in a very wide spectral range (5÷200 nm).

The flat diffraction grating with flat reflective working faces which lie in the grating plane and with non-reflective grooves between working faces is more robust and reliable as compared to transmissive grating. Also, it is more easily accessible, simple and inexpensive, as its manufacture requires less than half the technological process for producing transmissive gratings, as known from the paper by Wilhein T., et al. Review of Scientific Instruments. 70, 1694 (1999).

Using a flat amplitude reflection grating with the width of working faces equal to d/2 allows to eliminate all even diffraction orders and ensures deep suppression of higher odd orders, providing for measurements with a high signal level and a low level of noise. This is also facilitated by the gate installed in front of the radiation detector to inhibit radiation in the 0 diffraction order.

Geometry of such a grating allows to reliably calculate its reflection coefficient for different wavelengths. Along with using an absolutely calibrated optical detector, this allows to take absolute and quantitative measurements in a wide spectral range, in particular, to determine efficiency of EUV sources and the energy balance of their radiation in different spectral ranges. Correspondingly, the spectrometer features spectral sensitivity calibration in preferred embodiments of the invention.

Illumination of the flat amplitude reflection grating with the grazing angle θ in the range of 4 to 6 degrees ensures optimally high values of diffraction grating reflection coefficient, its coverage by the radiation beam and spectrometer resolving power λ/δλ.

Optimization of spectrometer resolving power λ/δλ is also ensured by a small, $\geq 10^{-3}$ rad, angular size of the radiation source and by the diffraction grating being located as close to the entrance slit as possible The latter also helps to minimize spectrometer outside dimensions, as it is characterized by a very compact design.

Using a multi-element optical detector, in particular, a CCD detector, allows to achieve high sensitivity, high measurement stability, and provides the calibration capability for quantitative measurements.

The spectrometer embodiment with a two-dimensional detector and additional slit parallel to the diffraction plane additionally allows to record the radiation source size in various VUV spectrum ranges with a high spatial resolution.

Besides spectrum recording in the −1st diffraction order in an extremely wide spectral range (5÷200 nm) with moderate resolution (λ/δλ~15-30), the spectrometer is capable of simultaneously recording in the +1st diffraction order in a more narrow spectral range, for example, 5-15 nm, with a sufficiently high spectral resolution ($\lambda/\delta\lambda \sim 100 \div 150$).

The spectrometer allows to simultaneously measure spectral and energy parameters of lithographic EUV sources in proximity of EUV lithography wavelength of 13.5 nm and beyond it in a wide spectral range.

Gate installation protects the detector from excessive exposure of the 0 diffraction order and ensures detector operation under rated conditions.

The software makes the measurements more convenient, including measurement in two spectral ranges.

Spectrometer design ensures its extremely small size, ease of installation and operation.

The above-mentioned and other features and benefits of the invention will be made more evident in the invention description and claims below.

BRIEF DESCRIPTION OF DRAWINGS

The technical substance and working principle of the proposed device are demonstrated in the drawings, namely.

These drawings do not cover and certainly do not restrict the complete scope of embodiments of this technical concept; they are provided only as supporting materials to demonstrate specific instances of its implementation.

DETAILED DESCRIPTION OF THE PREFERRED EMBODIMENTS OF THE INVENTION

This description is provided to illustrate how the invention can be implemented and in no way to demonstrate the scope of this invention.

Figure 1:
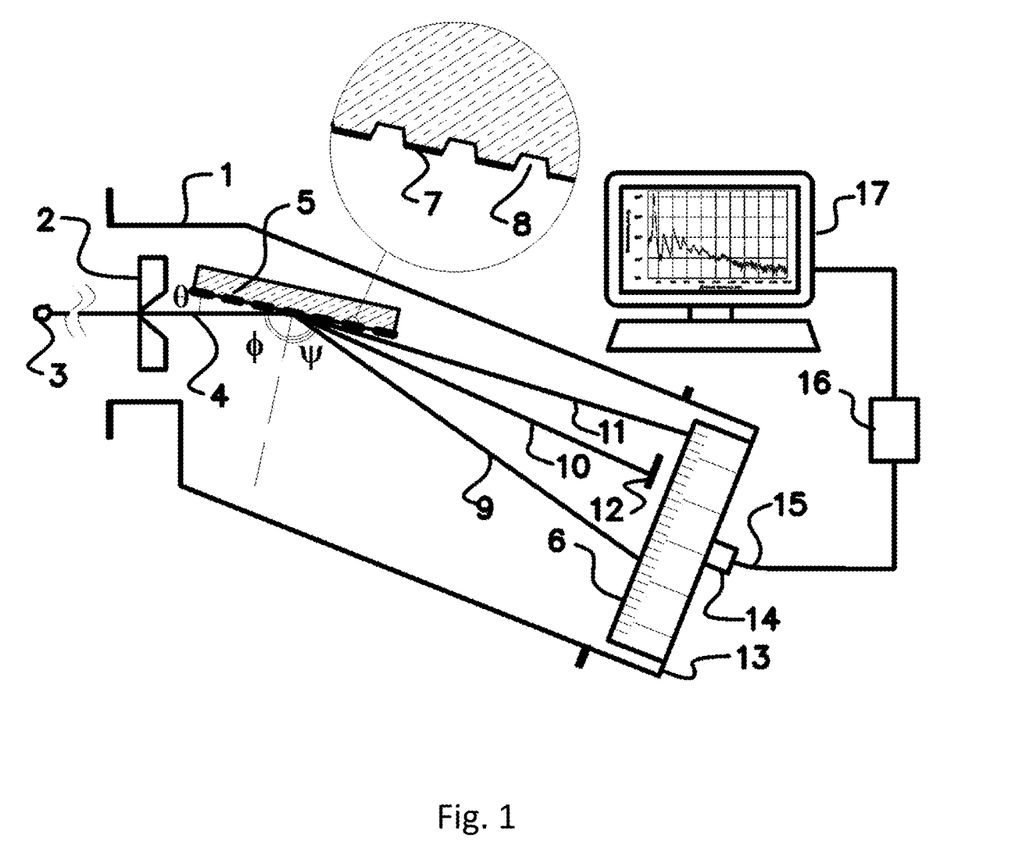
FIG. 1—wide band VUV spectrometer layout view according to this invention.

According to an example of the invention implementation illustrated in FIG. 1, the compact wide-range VUV grazing incidence spectrometer comprises the following parts located in housing 1: an entrance slit 2 illuminated by a remote radiation source 3 and emitting a radiation beam 4 which illuminates a diffraction grating 5 having a constant period d under the grazing angle $\theta$, and a detector 6. The spectrometer is characterized by the diffraction grating 5 being designed to be flat, with a relief, with flat reflective working faces 7 which lie in the plane of the grating 5, and with non-reflective grooves 8 between working faces 7, whereas the detector 6 is capable of recording VUV spectra in the 1st diffraction order.

The diffraction order (−1) corresponds to diffraction angles $\psi < \phi$, where $\phi$ is the angle of incidence, and the diffraction order (+1) corresponds to diffraction angles $\psi > \phi$. In FIG. 1, beams 9, 10, and 11 are reflected from diffraction grating 5 in the −1st, 0 and +1st diffraction orders, correspondingly.

To prevent excessive exposure of detector part 6, a gate 12 can be installed in front of it to block radiation in the 0 diffraction order. At the same time, the housing 1 can be equipped with an outside lever which allows to move the gate into the operating position.

Detector 6 is preferably located inside detector housing 13 which can be designed as a removable part of spectrometer evacuated housing 1. The detector is connected to control unit 16 by cable 15 via sealed cable gland 14 with a connector. In device embodiments, the control unit 16 may be located inside detector housing 13. Further, control unit 16 is connected by means of a USB-cable to a personal computer (PC) 17. Spectrometer power is preferably supplied via the computer USB port; it is operated using a control program which is also a tool for performing various evaluations of recorded spectra.

Preferably, detector 6 is a multi-element one. A digital backlit CCD camera may be used as a detector for recording VUV spectra. This ensures high sensitivity and spectrometer calibration capability for taking quantitative measurements.

In preferred embodiments of the invention, the width of working faces 7 of the diffraction grating is d/2, i.e. half the diffraction grating period; it eliminates all even diffraction orders and ensures deep suppression of higher odd orders.

Diffraction grating installation under a grazing angle eliminates light scattering and reflection by grooves 8 of the grating. For this purpose, the depth of grooves 8 between working faces 7 of the grating is greater than $d/4 \sin\theta$, which ensures a simple geometry of diffraction grating with reflection only from working faces 7.

All the above-mentioned features ensure measurement with a high signal level and a low noise level.

For simplification purposes, the diffraction grating is designed with either rectangular or trapezoidal profile of grooves between working faces.

The amplitude diffraction grating designed as described above is more robust and reliable as compared to a transmissive grating, as well as more readily accessible and easier to produce. Geometry of such a diffraction grating allows to reliably calculate its reflection coefficient for various wavelengths; along with using an absolutely calibrated detector, this allows to take quantitative measurements in a wide spectral range.

Spectral resolution $\delta\lambda$ is determined by the number N of diffraction grating marks engaged in diffraction, the width of monochromatic line image in the registration plane for point and extended sources and by the width of the instrument function of the detector used. According to the invention, these factors which determine the resulting value of spectral resolution, are optimized as follows.

To optimize the number N of marks engaged in diffraction, the diffraction grating is installed in such a manner that the grazing angle $\theta$ is preferably in the range of 4 to 6 degrees. This also allows to improve reflection of diffraction grating 5 in the VUV range. Furthermore, the grazing angle $\theta$ of 4 to 6 degrees corresponds to a small cut-off wavelength on the short-wavelength side of the working spectral region: 4 to 6 nm.

To optimize spectrometer resolving power $\lambda/\delta\lambda$ by means of reducing the width of monochromatic line image in the registration plane of detector 6, the angular size of radiation source 3, determined by the ratio of its characteristic dimension a and its distance from entrance slit A, is preferably not greater than $10^{-3}$ rad: $a/A \leq 10^{-3}$ rad.

For the same purpose, the diffraction grating is positioned as close to the entrance slit as possible, in particular, the distance 1 from diffraction grating 5 to entrance slit 2 is much less than the distance L from the diffraction grating to the detector: $l \ll L$. This also helps minimize spectrometer size.

For optimum detector operation and agreement of its spatial resolution with the real spectral structure, the diffraction direction to detector edge determines the long-wavelength limit $\lambda_{-1}$ of the working spectral region in the 1st diffraction order.

Detector edge is understood as the edge of the detector working area. For a multi-element linear detector, this is the outermost detector element, while for a two-dimensional detector, this is the outermost column of detector elements oriented perpendicular to the diffraction plane.

Preferably, the working spectral region in the −1st diffraction order is in the range of 5 to 200 nm. Spectral measurements in this range allow to diagnose plasma radiation sources, including those designed for projection EUV lithography.

Figure 2:
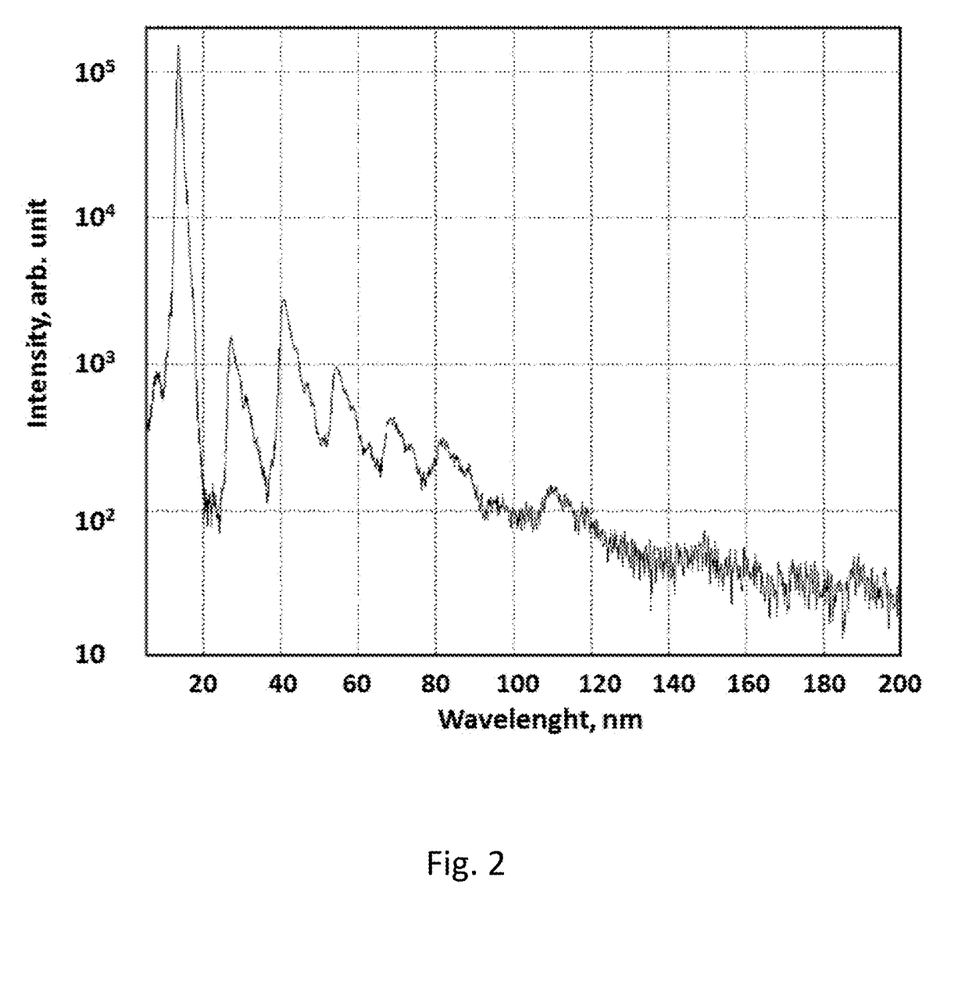
FIG. 2—spectrum of laser produced Sn plasma in the 6-200 nm VUV range.

Typically, radiation sources for projection EUV lithography are based on using laser produced tin plasma (Sn). FIG. 2 shows a spectrum of laser produced Sn plasma in the VUV range of 6-200 nm obtained in the −1st diffraction order using a spectrometer designed according to this invention. In line with spectrometer software capabilities, the spectrum is presented in the semi-logarithmic scale.

In the preferred embodiment of the invention illustrated in FIG. 1, the spectrometer is characterized by additional VUV spectrum recording in the +1st diffraction order. Furthermore, the long-wavelength limit $\lambda_{+1}$ of the +1st order working spectral region is many times less than the long-wavelength limit $\lambda_{-1}$ of the −1st order working spectral region, $\lambda_{+1} \ll \lambda_{-1}$, and the spectral resolution $(\lambda/\delta\lambda)_{+1}$ in the −1st diffraction order is many times greater than the spectral resolution $(\lambda/\delta\lambda)_{-1}$ in the −1st diffraction order: $(\lambda/\delta\lambda)_{+1} \gg (\lambda/\delta\lambda)_{-1}$.

To efficiently use detector 6, the angle $\psi$ of diffraction in the direction towards detector edge is not greater than 90°, whereas the direction of diffracted beam towards the edge of detector 6 corresponds to direction towards the limit wavelength of the +1st order working spectral region.

In preferred embodiments of the invention, to ensure optimum use of the detector, both its edges determine the long-wavelength limits $\lambda_{-1}$ and $\lambda_{+1}$ of the working spectral regions in the −1st and +1st order.

In the spectrometer designed according to the invention, the diffraction pattern in the (+1) and (−1) diffraction orders is strongly asymmetrical. The +1st order has the cutoff wavelength of $\lambda_{co}$ which corresponds to the diffraction angle $\psi=90°$. In proximity of $\lambda_{co}$, spectrometer dispersion D [nm/mm] is very low, while spectral resolution $(\lambda/\delta\lambda)_{+1}$ is high. Grazing angle $\theta$ can be selected in such a manner that the wavelength range of interest, in particular, $\lambda=13.5$ nm, is as close to $\lambda_{co}$ as possible. In this case, a medium spectral resolution $(\lambda/\delta\lambda)_{+1}$ of up to (100-200) can be achieved at $\lambda=13.5$ nm in the (+1) diffraction order, and a very wide spectral range can be observed in the (−1) order with a low spectral resolution: $(\lambda/\delta\lambda)_{-1}$ up to (15-30).

Accordingly, in the preferred embodiment of the invention the grazing angle $\theta$ is selected in such a manner that the cut-off wavelength $\lambda_{co}$ corresponding to the diffraction angle $\psi=90°$ is greater than the EUV lithography wavelength of 13.5 nm: $\lambda_{co}>13.5$, and the +1st order working spectral region includes the wavelength of 13.5 nm: $\lambda_{+1}>13.5$ nm. At the same time, it is preferable that the long-wavelength limit $\lambda_{+1}$ of the working spectral region is close to the wavelength of 13.5 nm: $0<(\lambda_{+1}-13.5 \text{ nm})\ll 13.5$ nm.

The spectrometer was tested using laser produced plasma as radiation source 3. To generate plasma, a $CO_2$ laser was used, with the radiation wavelength of 10.6 μm, the energy of 0.5 J in a pulse of 100 ns duration and the focal spot 300 μm in diameter. Tin and other materials were used as the target material. Hamamatsu S7030-1006N SPL detector was employed, with the number of pixels 1,024×58, and the working area of 24.6×1.36 mm.

Figure 3:
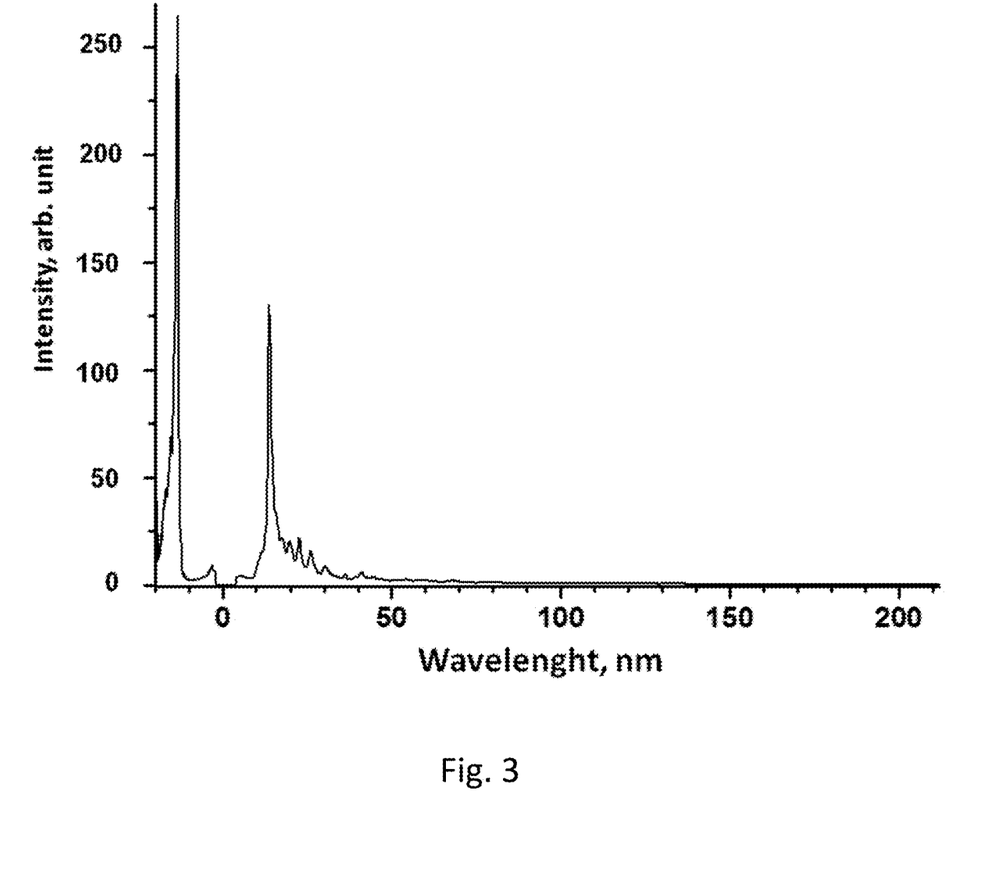
FIG. 3—spectra of laser produced Sn plasma in the +1st and −1st diffraction orders with suppression of the 0 diffraction order, FIG. 4—measurement design with additional slit in the diffraction plane for source size visualization, FIG. 5—spectra images with spatial resolution in the direction perpendicular to the diffraction direction, FIG. 6—an image of spectrometer engineering prototype.

Testing was performed under the following parameters:
entrance slit width 84 μm,
distance radiation source entrance slit 400 mm.
grazing angle $\theta=5.5°$,
distance entrance slit—diffraction grating 3.5 mm,
diffraction grating: period $d=3$ μm, size 3×3 mm, material $SiO_2$, rectangular profile grooves with the width of $d/2=1.5$ μm,
distance diffraction grating detector 56 mm, In FIG. 3, measured spectra of laser produced Sn plasma are shown. The spectrometer allows to observe a very wide spectral range of 6-200 nm in the (−1) order with a low spectral resolution $(\lambda/\delta\lambda)_{-1} \sim 15-30$, and a narrow spectral range close to the EUV lithography wavelength of $\lambda=13.5$ with a medium spectral resolution of $(\lambda/\delta\lambda)_{+1} \sim 100-200$. In FIG. 3, a spectrum with 0 diffraction order suppression is shown. This protects the detector from excessive exposure and ensures spectrum recording with a high signal level and a low noise level.

Figure 4:
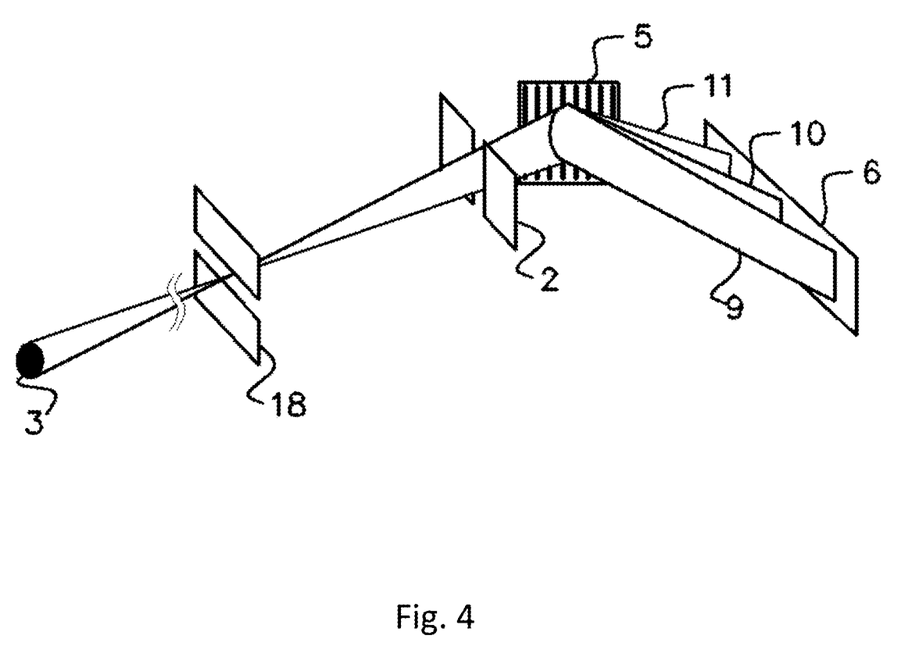

According to the embodiment of the invention, schematically illustrated in FIG. 4, the spectrometer features a two-dimensional detector 6, and the entrance slit 2 is illuminated through an additional slit 18 installed between the entrance slit and the radiation source 3 and parallel to the dispersion plane. This allows to record the size of VUV source emitting region at various wavelengths of the VUV spectrum with a high spatial resolution.

Figure 5:
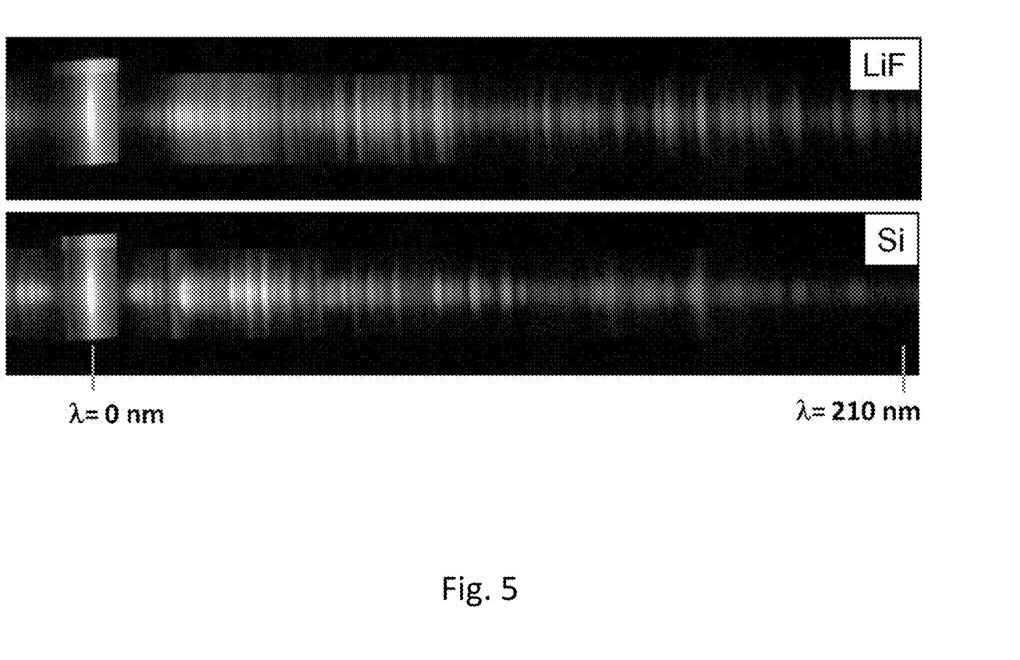

Images of spectra (without 0 order diffraction suppression) of laser produced silicon (Si) and lithium fluoride (LiF) plasma obtained with the Andor digital VUV camera as two-dimensional detector, are shown in FIG. 5.

Preferably, the spectrometer is provided with software that allows acquisition, processing, display and storage of spectral measurement data in the +1st and −1st diffraction orders. This ensures that the spectrometer is user-friendly while recording a unique set of parameters.

Figure 6:
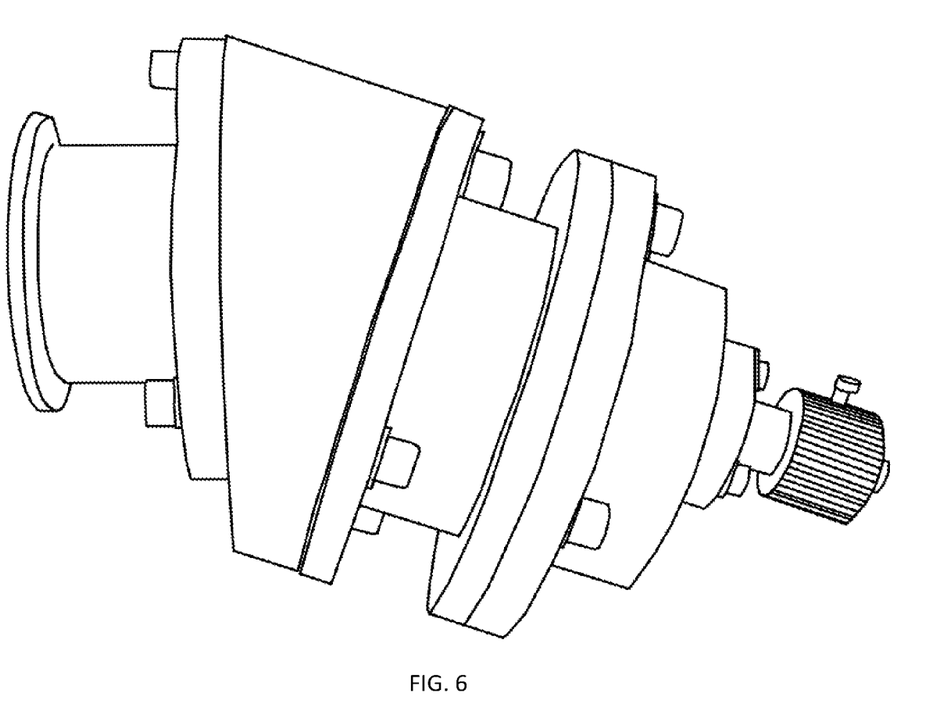

FIG. 6 shows an image of spectrometer engineering prototype demonstrating that it is extremely small in size; spectrometer largest dimension does not exceed 30 cm.

For ease of operation spectrometer housing is designed as the quick-release part of a pressure-tight joint. For this purpose, as shown in FIG. 6, spectrometer housing 1 may comprise the KF-40 inlet flange, which allows to quickly connect the spectrometer to the vacuum chamber containing the VUV radiation source, and disconnect it.

Thus, the spectrometer allows to simultaneously record spectra on the edge of the (+1) reflection order with a sufficiently high spectral resolution $(\lambda/\delta\lambda \sim 100 \div 150)$ and in the (−1) order with a moderate resolution $(\lambda/\delta\lambda \sim 15-30)$, but in a very wide spectral range (5-200 nm). Prior calculation of the reflection coefficient of the amplitude reflective diffraction grating and using an absolutely calibrated detector, in particular, a CCD detector, allow to take absolute and quantitative measurements of intensities in these spectral ranges. The spectrometer is efficient for checking radiation sources with a small angular aperture. Spectrometer embodiments provide for recording dimensions of the radiation source emitting area in various ranges of the VUV spectrum. The spectrometer is characterized by a very small size and ease of operation.

INDUSTRIAL APPLICABILITY

The proposed invention is intended for use in instrument engineering, in particular, for building VUV range spectrometers, including for checking plasma radiation sources designed for projection EUV lithography.

Description of the preferred invention embodiment is provided for illustration and description purposes. It is not intended to be exhaustive or to limit the invention by the specific forms disclosed. Obviously, many modifications and versions will be evident to professionals in this technical field. It is assumed that the scope of the invention is determined by the following claims and their equivalents.

What is claimed is:

1. A wide-range vacuum ultraviolet (VUV) spectrometer, comprising:
   an entrance slit located in a housing illuminated by a remote radiation source and emitting a radiation beam which illuminates a diffraction grating having a constant period d under a grazing angle $\theta$, and a detector,
   the diffraction grating is designed with flat reflective working faces which lie in a grating plane, and with non-reflective grooves between the working faces, whereas
   the detector is capable of recording vacuum ultraviolet (VUV) spectra in a negative first ($-1^{st}$) diffraction order,
   wherein a detector edge defines a long-wavelength limit $\lambda_{-1}$ of the negative first ($-1^{st}$) diffraction order working spectral region.

2. The wide-range vacuum ultraviolet (VUV) spectrometer as claimed in claim 1 wherein a working spectral region in the negative first ($-1^{st}$) diffraction order is in a range of 5 to 200 nm.

3. The wide-range vacuum ultraviolet (VUV) spectrometer as claimed in claim 1 wherein a width of the diffraction grating working faces equals d/2, a diffraction grating half-period.

4. The wide-range vacuum ultraviolet (VUV) spectrometer as claimed in claim 1 wherein the depth of the grooves between the grating working faces is greater than $d/4 \sin \theta$.

5. The wide-range vacuum ultraviolet (VUV) spectrometer as claimed in claim 1 wherein the diffraction grating is designed with either rectangular or trapezoidal profile of grooves between working faces.

6. The wide-range vacuum ultraviolet (VUV) spectrometer as claimed in claim 1 wherein a radiation source angular size, defined by a ratio of its characteristic dimension a and its distance from the entrance slit A, is not greater than $10^{-3}$ rad: $a/A \leq 10^{-3}$ rad.

7. The wide-range vacuum ultraviolet (VUV) spectrometer as claimed in claim 1 wherein the grazing angle $\theta$ is in a range of 4 to 6 degrees.

8. The wide-range vacuum ultraviolet (VUV) spectrometer as claimed in claim 1 wherein the detector is a multi-element one.

9. The wide-range vacuum ultraviolet (VUV) spectrometer as claimed in claim 1 featuring spectral sensitivity calibration.

10. The wide-range vacuum ultraviolet (VUV) spectrometer as claimed in claim 1 wherein the detector is a two-dimensional one, and the entrance slit is illuminated through an additional slit installed between the entrance slit and the radiation source and parallel to a dispersion plane.

11. The wide-range vacuum ultraviolet (VUV) spectrometer as claimed in claim 1 wherein the housing is configured to have a quick-release part which allows to connect the spectrometer to a vacuum chamber containing a vacuum ultraviolet (VUV) radiation source.

12. The wide-range vacuum ultraviolet (VUV) spectrometer as claimed in claim 1 with additional VUV spectrum recording in the positive first ($+1^{st}$) diffraction order, whereas the long-wavelength limit of the positive first ($+1^{st}$) order working spectral region $\lambda_{+1}$ is many times less than the long-wavelength limit of the negative first ($-1^{st}$) order working spectral region $\lambda_{-1}$:

$$\lambda_{+1} \ll \lambda_{-1}.$$

13. The wide-range vacuum ultraviolet (VUV) spectrometer as claimed in claim 12 wherein the detector is installed in such a manner that the diffraction angle in a direction of the detector edge is not greater than 90°.

14. The wide-range vacuum ultraviolet (VUV) spectrometer as claimed in claim 12 wherein the detector edge defines the long-wavelength limit $\lambda_{+1}$ of the positive first ($+1^{st}$) diffraction order working spectral region.

15. The wide-range vacuum ultraviolet (VUV) spectrometer as claimed in claim 12 wherein the grazing angle $\theta$ is selected in such a manner that a cut-off wavelength $\lambda_{co}$ corresponding to a diffraction angle $\psi=90°$ is greater than an EUV lithography wavelength of 13.5 nm: $\lambda_{co} > 13.5$ nm, and the positive first ($+1^{st}$) order working spectral region includes the wavelength of 13.5 nm: $\lambda_{+1} > 13.5$ nm.

16. The wide-range vacuum ultraviolet (VUV) spectrometer as claimed in claim 12 wherein the positive first ($+1^{st}$) order working spectral region includes a wavelength of 13.5 nm and the long-wavelength limit $\lambda_{+1}$ of the working spectral region is close to the wavelength of 13.5 nm:

$$0 < (\lambda_{+1} - 13.5 \text{ nm}) \ll 13.5 \text{ nm}.$$

17. The wide-range vacuum ultraviolet (VUV) spectrometer as claimed in claim 12 wherein a gate is installed before the detector which inhibits radiation in a 0 diffraction order.

18. The wide-range vacuum ultraviolet (VUV) spectrometer as claimed in claim 12 wherein the spectrometer is provided with software designed for acquisition, processing, display and storage of spectral measurement data in the positive first ($+1^{st}$) and negative first ($-1^{st}$) diffraction orders.

19. A wide-range vacuum ultraviolet (VUV) spectrometer, comprising:
   an entrance slit located in a housing illuminated by a remote radiation source and emitting a radiation beam which illuminates a diffraction grating having a constant period d under a grazing angle $\theta$, and a radiation detector, the diffraction grating is designed with flat reflective working faces which lie in a grating plane, and with non-reflective grooves between the working faces; the radiation detector allows for vacuum ultraviolet (VUV) spectrum recording in a positive first ($+1^{st}$) diffraction order and a negative first ($-1^{st}$) diffraction order, whereby a long-wavelength limit $\lambda_{+1}$ of the positive first ($+1^{st}$) order working spectral region is many times less than a long-wavelength limit $\lambda_{-1}$ of a negative first ($-1^{st}$) order working spectral region: $\lambda_{+1} \ll \lambda_{-1}$, and a spectral resolution $(\lambda/\delta\lambda)_{+1}$ in the negative first ($-1^{st}$) order working spectral region is many times greater than the spectral resolution $(\lambda/\delta\lambda)_{-1}$ in the negative first ($-1^{st}$) order working spectral region: $(\lambda/\delta\lambda)_{+1} \gg (\lambda/\delta\lambda)_{-1}$,
wherein a detector edge defines a long-wavelength limit $\lambda_{-1}$ of the negative first ($-1^{st}$) diffraction order working spectral region.

* * * * *